United States Patent [19] [11] 4,110,513
Heitmann et al. [45] Aug. 29, 1978

[54] FIRE RESISTANT PLYWOOD

[75] Inventors: Glenn Alvin Heitmann, Morrison; Milton French Trosper, Jr., Littleton, both of Colo.

[73] Assignee: Johns-Manville Corporation, Denver, Colo.

[21] Appl. No.: 729,500

[22] Filed: Oct. 4, 1976

[51] Int. Cl.² .................. B32B 21/08; B32B 27/42
[52] U.S. Cl. ..................................... 428/528; 252/8.1; 428/529; 428/538; 428/921
[58] Field of Search ............ 428/528, 529, 530, 531, 428/538, 539, 921; 252/8.1

[56] References Cited

U.S. PATENT DOCUMENTS

| | | | |
|---|---|---|---|
| 2,217,265 | 10/1940 | Cislak | 428/529 |
| 3,369,056 | 2/1968 | Schwartz | 428/529 |

Primary Examiner—Marion E. McCamish
Attorney, Agent, or Firm—Robert M. Krone; Joseph J. Kelly; James W. McClain

[57] ABSTRACT

A plywood body is disclosed which comprises at least two plies of wood bonded together with a phenolic resin adhesive having platey talc incorporated therethrough in amounts of about 5 to 200 parts by weight per 100 parts by weight of resin. Such plywood bodies (particularly boards) have significantly greater fire resistance than do plywood bodies containing conventional phenolic adhesives.

3 Claims, No Drawings

FIRE RESISTANT PLYWOOD

BACKGROUND OF THE INVENTION

The invention herein relates to phenolic adhesives. More particularly it relates to phenolic adhesives useful as adhesives for exterior grade plywood.

As is well known, plywoods are manufactured by joining layers or plies of wood veneer or of wood veneer and a lumber core with a suitable adhesive. Exterior grade plywoods are bonded with thermosetting phenol-aldehyde ("phenolic") resins because these resins are resistant to the effects of water, even boiling water. Descriptions of typical adhesives of this type and their use as plywood adhesives will be found in U.S. Pat. No. 3,755,067 issued to A. Schnabel.

Phenolic bonded plywood offers little fire resistance, as the fire penetrates the various plies of wood and adhesive rather quickly. Conseqeuntly the use of such plywood is subject to various restrictions where there are fire code requirements. It would therefore be an advantage to have a phenolic bonded exterior grade plywood which would be capable of meeting more stringent requirements for fire resistance. Such a material not only would be able to comply with more stringent fire codes, but would also offer a greater degree of safety and protection for people in buildings where it is used in walls, floors and the like.

BRIEF SUMMARY OF THE INVENTION

The invention herein comprises a plywood body comprising at least two plies of wood bonded together by a phenol-aldehyde ("phenolic") resin adhesive, said adhesive having incorporated therethrough platen talc in an amount of from 5 to 200 parts by weight per 100 parts by weight of the resin (hereinafter referred to as "phr").

DETAILED DESCRIPTION AND PREFERRED EMBODIMENTS

The invention herein involves the discovery that incorporation of platey talc into a phenol-aldehyde resin adhesive allows that adhesive to impart to plywood a significant degree of fire resistance. The exact reason for this superior fire resistance is not known, but it is believed that the platey nature of the talc acts to reflect much of the heat from the fire which impinges on the plywood, substantially inhibiting the passage of that heat into and through the plywood. Thus while the outermost ply of wood directly exposed to the fire will be severely damaged, the reflective nature of the platey talc in each layer of adhesive sequentially reduces the amount of heat passing through each layer of adhesive to the next ply of wood and thus allows each subsequent ply of wood to withstand the effects of the fire for significantly greater lengths of time.

The talc useful in the present invention may be any platey talc which is of a commercial grade of purity. Talc is a soft hydrous magnesium silicate material which is found widely throughout the world in various deposits. As with any natural mineral, the nature of the talc in each deposit will be slightly different from that of the talc of other deposits, principally in the various types of minerals with which it is associated. However, there have been developed many different processes, such as flotation, for purifying talc from the various deposits. In addition, talc of relatively high purity is readily available commercially from refineries.

In the present invention the talc will be used in the adhesive in a concentration of from 5 to 200 phr, preferably 50 to 125 phr.

In some deposits talc is found associated with acicular materials such as tremolite. Often relatively crude ore comprising a mixture of the talc and the acicular material is sold commercially as so-called "fibrous talc". For the purposes of this invention, however, it is necessary that the platey talc be separated from the acicular materials, for the latter do not enhance the fire resistance of the plywood. Consequently, material known as "fibrous talc" is not normally considered to be within the scope of the present invention.

Phenolic resins suitable for use in the invention are thermosetting, base catalyzed, resinous condensation products (soluble in aqueous solvents) of one or more hydroxy aromatic compounds (phenols) and one or more suitable aldehydic materials. "Aldehydic", as employed herein, refers to aldehydes and similarly acting materials. From about 1.8 to about 3, preferably from 2.0 to 2.3, chemical equivalents of the aldehydic material are reacted with each mole of the phenol used. Particular resinous products are obtained by partially condensing, in appropriate proportions to provide a thermosetting product, a phenol, such as phenol, cresol, resorcinol or 3,5-xylenol, with a suitable aldehydic material. Specific examples of suitable aldehydes, or similarly acting materials, are aqueous formaldehyde, paraformaldehyde, trioxymethylene and the like methylene providing materials. Also operable are acetaldehyde, furfuraldehyde and the like aldehydic materials which react with the mentioned phenols to form soluble, intermediate, polycondensation products.

The above thermosetting phenolic resins are normally prepared in the presence of an aqueous solvent with the aid of a basic catalyst. The usual procedure is to mix desired proportions of the resin forming reactants into a sufficient amount of an aqueous solvent to provide a liquid reaction system having from about 30 to about 60 percent by weight solids. A basic catalyst is added to the reaction mixture and the resulting system is heated at an elevated temperature to provide a partially condensed, fusible resin, which is at least water-dispersible, if not completely water-soluble, in the presence of alkali. Exemplary aqueous solvents include in addition to water, mixtures of water with water-soluble alcohols and ketones. Generally, any organic solvent miscible with water and essentially inert to the condensing reactants can be used as the reaction medium.

The water-dispersible, preferably causticized organic extender, mentioned above as a component of the standard phenolic resin formulation, may be completely soluble in water, or merely swellable therein, but in any event is capable of forming a homogeneous dispersion in water. Organic materials that can be suitably causticized by treatment with an alkali metal hydroxide to provide the causticized organic extenders include amylaceous materials, i.e., containing starches, such as may be obtained by processing wheat, corn, oats, rye and the like grains. Other sources of causticizable organic materials are the residues obtained by chemical treatment of oat hulls, corn cobs and the like remnants of grain processing. Wood and walnut shell flours and wood bark with solubles extracted also can be causticized. The amount of the alkali metal hydroxide used to causticize the aforementioned organic materials will normally fall within the limits from about 5 to about 35 percent by weight of the organic materials to be causticized.

It should be understood that standard phenolic resin adhesive formulations used in the invention may, and often do, involve the use of causticized forms of more than one of the aforementioned organic materials. For instance, it will be recognized by those skilled in the art that causticized forms of certain of the aforementioned organic materials can be added to the formulation as thickeners or glue line control agents as well as extenders for the resin solids. Moreover, still other organic materials are often used as optional thickeners. Examples of these materials are the naturally occurring and synthetic water-soluble gums such as gum arabic, karaya gum, locust bean gum, alginate, casein, soluble blood albumin and water-soluble cellulose ethers.

Regardless of the purpose for which it is added, enough of the water-dispersible organic extender may be employed to provide from 0.01 up to as much as 0.25 part by weight thereof per part by weight of resin solids in the adhesive formulation. For best results with the talc of the invention, it is preferred to maintain the extension with the water-dispersible organic extenders within the range from about 0.05 to 0.10 part by weight thereof per part by weight of the resin solids.

Another preferred component of the adhesive formulations of the invention is a small but catalytically effective amount of a catalyst for thermosetting or curing the phenolic resin. Examples of suitable basic catalysts are the alkali metal hydroxides (an excess of the alkali metal hydroxide used to causticize the organic extender is satisfactory). A preferred catalyst system utilizes an alkali metal hydroxide in an amount of from about 2 to 20 percent by weight of the resin solids.

The solid components of the adhesive formulation of the invention are dispersed or dissolved, as the case may be, in a sufficient amount of an aqueous solvent medium, which may be water or mixtures thereof with a water-soluble alcohol to provide a readily flowable or mechanically spreadable composition.

The adhesive formulations prepared in accordance with the invention are particularly well adapted for the bonding of wood veneers to provide plywoods. Such adhesive formulations are spread on the wood plies in amounts ranging from about 55 to 85 pounds of adhesive (including water) per thousand square feet of double glue line, with southern pine customarily requiring more adhesive than wood from the northwest part of the United States. The assembly time can vary from about 5 to about 30 minutes or more and preferably from 10 to about 20 minutes. A hot press cure using steamheated platens is recommended. The press time for satisfactory results can be within the range from about 3 to about 10 minutes or more depending upon the temperature of the platens, the plies being bonded, the number of panels per opening and other considerations, such as are apparent to those skilled in the art. After having been pressed and thoroughly cured at the bonding temperature for the glue formulation, the plywood is removed from the press and stacked for conditioning to a suitable residual moisture content. In a preferred embodiment of the invention the formulated adhesive composition has a thixotropic index of at least 5.

While this invention applies to plywood bodies having as few as two wood plies, it will be understood that there may be three, four, five or any greater number of wood plies, with each ply adhered to the next by the adhesive of the invention. Particularly included in this invention are the common three- and five-ply plywoods with two and four adhesive layers, respectively.

What is claimed is:

1. A plywood body comprising at least two plies of wood bonded together by a phenolic resin adhesive, said adhesive having incorporated therethrough platey talc in an amount of 5 to 200 parts by weight per 100 parts by weight of said resin.

2. A plywood body as in claim 1 wherein said platey talc is present in said adhesive as 50 to 125 parts by weight per 100 parts by weight of said resin.

3. A plywood body as in claim 1 wherein there are a plurality of plies of wood with each sequential pair bonded with said adhesive.

* * * * *

UNITED STATES PATENT AND TRADEMARK OFFICE
CERTIFICATE OF CORRECTION

PATENT NO. : 4,110,513
DATED : August 29, 1978
INVENTOR(S) : Glenn Alvin Heitmann et al It is certified that error appears in the above-identified patent and that said Letters Patent are hereby corrected as shown below:

Column 1, line 34, "platen" should read --platey--.

Signed and Sealed this

Twenty-fourth Day of April 1979

[SEAL]

Attest:

RUTH C. MASON
Attesting Officer

DONALD W. BANNER
Commissioner of Patents and Trademarks